United States Patent [19]

Suzuki et al.

[11] Patent Number: 5,262,137
[45] Date of Patent: Nov. 16, 1993

[54] METHOD FOR RECOVERING LITHIUM CHLORIDE

[75] Inventors: Hidetoshi Suzuki; Yoshinari Koyama, both of Ichihara, Japan

[73] Assignee: Idemitsu Petrochemical Co., Ltd., Tokyo, Japan

[21] Appl. No.: 766,111

[22] Filed: Sep. 27, 1991

[30] Foreign Application Priority Data

Sep. 28, 1990 [JP] Japan ............................ 2-259524

[51] Int. Cl.$^5$ ............................................. C01D 15/04
[52] U.S. Cl. ................................. 423/179.5; 423/184; 528/293; 528/299; 528/388
[58] Field of Search ............... 423/179, 191, 197, 499, 423/179.5, 184; 528/293, 299, 388

[56] References Cited

U.S. PATENT DOCUMENTS 4,919,911  4/1990  Shirota et al. ...................... 423/499

FOREIGN PATENT DOCUMENTS 0215312  3/1987  European Pat. Off. .
0306025  3/1989  European Pat. Off. .
0320142  6/1989  European Pat. Off. .
0409105  1/1991  European Pat. Off. .

Primary Examiner—David Brunsman
Attorney, Agent, or Firm—Oblon, Spivak, McClelland, Maier & Neustadt

[57] ABSTRACT

A method for recovery of lithium chloride wherein a dihalogen aromatic compound is reacted with an alkali metal sulfide and/or an alkali metal hydrosulfide in a polar solvent in the presence of lithium chloride and wherein after polyarylene sulfide particles and a matter insoluble in the solvent are separated from the resulting mixture, lithium chloride is recovered from a residual solution, characterized in that lithium chloride in the residual solution is separated on crystallization. In this manner, high purity lithium chloride may be recovered at a lower cost by a simple equipment, whilst high quality polyarylene sulfide may be obtained.

8 Claims, No Drawings

METHOD FOR RECOVERING LITHIUM CHLORIDE

BACKGROUND OF THE INVENTION

1. Field of the Invention

This invention relates to a method for recovering lithium chloride used as a polymerization assistant in the preparation of polyarylene sulfides.

2. Description of the Related Art

Polyarylene sulfides prepared in are general by reacting a dihalogen aromatic compound with an alkali metal sulfide and/or an alkali metal hydrosulfide in the presence of a polar solvent such as N-methyl-2-pyrrolidone (NMP). Lithium chloride is used in this case as a polymerization assistant for whiting, reducing the salt content and controlling the molecular weight of PAS.

Lithium chloride as a polymerization assistant need to be recovered after the reaction for re-use because it is used in a larger quantity almost equal to that of the alkali metal sulfide and/or the alkali metal hydrosulfide, and is expensive. For this reason, there has hitherto been proposed a method for recovering lithium chloride from a reaction mixture from the preparation process of PAS. For example, there have been known a method comprising removing a solvent from the reaction mixture, washing the reaction mixture with an acidic aqueous solution, blowing carbon dioxide into or adding carbonate to the washing liquid to precipitate lithium carbonate for recovery as lithium carbonate, and a method comprising recovering lithium chloride in the reaction mixture on calcination.

However, the former method of recovering lithium chloride as lithium carbonate is disadvantageous in that (i) equipment and operation for recovery tend to be complicated, (ii) a larger quantity of auxiliary materials for conversion into lithium carbonate is necessitated, (iii) lithium chloride cannot be recovered directly and (iv) impurities and oligomers are left in the polymer to deteriorate the quality of PAS.

The latter calcination method is also disadvantageous in that (i) calcination conditions need to be selected meticulously to prevent lithium chloride from being volatilized off during calcination or to prevent loss of the polar solvent, (ii) the product quality is lowered due to excessive calcination residues, (iii) recovered lithium chloride has a poor color tint; and (iv) since $SO_2$ is produced due to higher temperatures during calcination, it becomes necessary to use special materials for a calcination furnace.

SUMMARY OF THE INVENTION

Object of the Invention

In view of the above described states of the art, it is an object of the present invention to provide a method for recovery of lithium chloride, whereby lithium chloride may be recovered with a high yield and a high purity at a low cost by a simplified equipment and whereby high quality PAS may be obtained.

For accomplishing the above object, the present invention provides a method for recovering lithium chloride by reacting a dihalogen aromatic compound with an alkali metal sulfide and/or an alkali metal hydrosulfide in a polar solvent in the presence of lithium chloride, separating polyarylene sulfide particles and a matter insoluble in the solvent from the resulting reaction mixture and recovering lithium chloride from a residual solution, characterized in that lithium chloride in said residual solution is separated by crystallization.

Other objects and effects of the present invention will become apparent from the following description.

DETAILED DESCRIPTION OF THE INVENTION

The present invention will be explained in more detail hereinbelow.

According to the present invention, the solution from which lithium chloride is to be recovered is a residual solution obtained upon removing PAS particles and a matter insoluble in the solvent from a reaction mixture derived from a process in which a dihalogen aromatic compound is reacted with an alkali metal sulfide and/or an alkali metal hydrosulfide in a polar solvent, such as NMP, in the presence of lithium chloride. In the above reaction mixture, there are usually contained PAS (polymer particles), oligomers, lithium chloride, alkali metal salts, reaction impurities, polar solvents, water, unreacted monomers or the like.

Although the followings are typical of the above mentioned dihalogen aromatic compounds, alkali metal sulfides and alkali metal hydrosulfides and the polymerization methods, these are not limitative of the present invention (see JP Patent KOKAI Hei 1 246127).

(a) Dihalogen Aromatic Compounds

The dihalogen aromatic compounds, as a feed monomer, may include dihalobenzenes, such as m-dihalobenzene or p-dihalobenzene, alkyl-substituted dihalobenzenes or cycloalkyl-substituted dihalobenzenes, such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene, 1-normalhexyl-2,5-dihalobenzene, or 1-cyclohexyl-2,5-dihalobenzene, aryl-substituted dihalobenzenes, such as 1-phenyl-2,5-dihalobenzene, 1-benzyl-2,5-dihalobenzene or 1-p-toluyl-2,5-dihalobenzene, dihalobiphenyls, such as 4,4'-dihalobiphenyl, dihalonaphthalenes, such as 1,4-dihalonaphthalene, 1,6-dihalonaphthalene or 2,6-dihalonaphthalene, 3,5-dihalobenzoic acid, 4,4'-dihalophenyl ether, 4,4'-dihalodiphenyl ether, 4,4'-dihalodiphenyl keton 4,4'-dihalodiphenyl sulfide and 4,4'-dihalodiphenyl sulfoxide.

The two halogen elements in these dihalogen aromatic compounds are fluorine, chlorine, bromine or iodine and may be the same as or different from each other.

Among these dihalogen aromatic compound, dihalobenzenes and, above all, p-dichlorobenzene, is most preferred.

These dihalogen aromatic compound may be used alone or in combination or used in combination with other dihalogen aromatic compounds, such as dihalogen aromatic carboxylic acids or alkali metal salts thereof.

If need be, branching agents, such as trihalobenzene, dihaloaniline or dihalonitrobenzene or molecular weight controlling agents, such as monohalobenzene, thiophenol, phenol or aniline, may also be used.

(b) Alkali Metal Sulfides and Alkali Metal Hydrosulfides

As a sulfur for PAS, the alkali metal sulfides and/or alkali metal hydrosulfides, may be employed.

Among the alkali metal sulfides, there are lithium sulfide, sodium sulfide, potassium sulfide, rubidium sulfide and cesium sulfide.

Of these, sodium sulfide and lithium sulfide and, above all, sodium sulfide is preferred.

Among the alkali metal hydrosulfides, there are lithium hydrosulfide (LiHS), sodium hydrosulfide (NaHS), potassium hydrosulfide (KHS), rubidium hydrosulfide (RbHS), calcium hydrosulfide (CaHS) and cesium hydrosulfide (CsHS).

Of these, sodium hydrosulfide or lithium hydrosulfide and, above all, sodium hydrosulfide, is preferred.

These alkali metal sulfides and/or alkali metal hydrosulfides may be used alone or in combination.

The alkali metal sulfides and/or alkali metal hydrosulfides may be those obtained from hydrogen sulfide and alkali metal hydroxide as feed materials.

These alkali metal sulfides and/or alkali metal hydrosulfides may be used in the form of anhydrides, hydrates, aqueous solutions or water-containing mixtures. When the hydrates, aqueous solutions or the water-containing mixtures are used, dehydrating operations need be carried out before proceeding to the reaction process, as will be explained subsequently.

(c) Polar Solvents

Among the polar solvents, there are, for example, organic amide compound, lactam compound, urea compounds and cyclic organic phosphorus compounds. Examples of the polar solvents include N,N-dimethyl formaldehyde, N,N-dimethyl acetoamide, N,N-diethyl acetoamide, N,N-dipropyl acetomide, N,N-dimethyl benzoic acid amide, caprolactam, N-methyl caprolactam, N-ethyl caprolactam, N-isopropyl caprolactam, N-isobutyl caprolactam, N-normalpropyl caprolactam, N-normalbutyl caprolactam, N-cyclohexyl caprolactam, N-methyl-2-pyrrolidone, N-ethyl-2-pyrrolidone, N-isopropyl 2-pyrrolidone, N-isobutyl-2-pyrrolidone, N-normalpropyl-2-pyrrolidone, N-normalbutyl-2-pyrrolidone, N-cyclohexyl-2-pyrrolidone, N-methyl-3-methyl-2-pyrrolidone, N-cyclohexyl-2-pyrrolidone, N-ethyl-3-methyl-2-pyrrolidone, N-methyl-3,4,5-trimethyl-2-pyrrolidone, N-methyl 2-piperidone, N-isopropyl-2-piperidone, N-methyl-2-piperidone, N-ethyl 2-piperidone, N-isopropyl-2-piperidone, N-methyl-6-methyl-2-piperidone, N-methyl-3-ethyl-2-piperidone, tetramethyl urea, N,N'-dimethyl ethylene urea, N,N'-dimethyl propylene urea, 1-methyl 1-oxosulfolane, 1-ethyl-1 oxosulfolane, 1-phenyl-1-oxosulfolane, 1-methyl 1-oxosulfolane, 1-normalpropyl-1-oxophospholane and 1-phenyl 1-oxophospholane.

These polar solvents may be used alone or in combination.

Of these polar solvents, non-protonic organic amides or lactams are preferred. Above all, N-alkyllactam and N-alkylpyrrolidone and, particularly, N-methyl-2-pyrrolidone, is preferred.

(d) Lithium Chloride

Lithium chloride is used as polymerization assistant in the preparation of PAS.

The amount of lithium chloride used for this purpose is usually selected to be in a range of from 0.03 to 2.0 mols and preferably in a range of from 0.1 to 1.6 mols to one mol of the above mentioned alkali metal sulfide and/or alkali metal hydrosulfide. If the amount of lithium chloride is less than 0.03 mol, the molecular weight of a yielded polymer may be low, or the content of salts, such as sodium chloride, present as foreign matter in the PAS particles, can not be reduced sufficiently. On the other hand, if the amount exceeds 2.0 mols, the effect of lithium chloride as a polymerization assistant can not be increased correspondingly but may rather undesirably persist in the yielded polymer at a higher concentration.

It is noted that if, in cases wherein lithium chloride as a polymerization assistant is not used or is used in an extremely small quantity, lithium sulfide is used as an alkali metal sulfide of the feed material, this lithium sulfide is reacted with the dihalogen aromatic compound to yield lithium chloride which then acts as a polymerization assistant. Lithium chloride yielded in this manner also acts as lithium chloride in the sense of the present invention.

(e) Operation of Polymerization Reaction

In carrying out the above mentioned polymerization reaction, the dihalogen aromatic compound is brought into contact in a polar solvent, in the presence of lithium chloride, with the alkali metal sulfide and/or alkali metal hydrosulfide, for producing PAS.

In the case, the dihalogen aromatic compound is used in an amount corresponding to a molar ratio of 0.75:1 to 2.0:1 and preferably 0.9:1 to 1.2:1 with respect to the alkali metal sulfide and/or alkali metal hydrosulfide.

Although there is no limitation to the amount of the polar solvent used, provided that it is such an amount as to permit a uniform reaction process, it is usually selected to be in a range of from 0.1 to 10 times the total weight of the feed components and the polymerization assistant summed together. If the amount is less than 0.1 times the aforementioned total weight, the reaction may proceed non-uniformly. On the contrary, if the amount exceeds 10 times the total weight, the volumetric efficiency and hence the productivity is lowered.

A preferred example of the reaction of the dihalogen aromatic compound with the alkali metal sulfide and/or the alkali metal hydrosulfide is hereinafter explained.

Alkali metal sulfides and/or alkali metal hydrosulfides and lithium chloride are introduced in predetermined amounts into a polar solvent. After dehydration by azeotropic or vacuum distillation, dihalogen aromatic compound and occasionally employed additive are added to the reaction system in predetermined amounts, and the resulting mass is heated to a range usually of 180° to 330° C. and preferably 220° to 300° C. to carry out a polymerization reaction. The reaction temperature lower than 180° C. is too low and impractical. On the other hand, if the reaction temperature exceeds 330° C., coloration or gelling may be produced due to side reactions or deterioration of the yielded polymers.

Although the reaction time depends on the types or the amount ratio of the feed materials employed or the amount of the polymerization assistant and hence cannot be determined monistically, it is usually less then 20 hours and preferably in the order of 0.1 to 8 hours.

This polymerization reaction is carried out under an atmosphere of an inert gas, such as nitrogen, argon, carbon dioxide or steam. Although there is no particular limitation as to the reaction pressure, the reaction is usually carried out under a pressure ranging from the spontaneous pressure of the polymerization reaction system, such as a solvent, to 50 Kg/cm$^2$ (absolute pressure).

If one or both of lithium chloride and alkali metal sulfide and/or alkali metal hydrosulfide is in the state of an aqueous solution or hydrate or in the water-containing state, lithium chloride or alkali metal sulfide and/or alkali metal hydrosulfide is introduced into the polar solvent and dehydrated, such as by azeotropic or vacuum distillation, to produce a liquid mixture, to which a substantially anhydrous dihalogen aromatic compound is introduced to carry out a reaction.

If lithium chloride and the feed components, namely the alkali metal sulfides and/or alkali metal hydrosulfides, are all anhydrous, there is no particular limitation as to the sequence of addition of the respective components into the polar solvent. The reaction may be a one-stage reaction, carried out at a constant temperature, or a multi-stage reaction, in which the temperature is raised stepwise. The reaction style, in which the temperature is raised slowly, may be adopted.

As means for removing the PAS particles and the matter insoluble in the solvent from the reaction mixture, the following methods (A) to (C) are given only by way of illustration.

(A) Filtration

The reaction mixture is filtered for collecting the PAS particles on a filter.

In this case, only PAS in particulate form is filtered off, while a residual solution, composed of oligomers, lithium chloride, alkali metal salts, reaction impurities, polar solvents, water, non-reacted monomers etc. are collected under the filter.

The filter capable of filtering only the PAS particles is usually 200 to 5 and preferably 100 to 16 mesh size.

Since the PAS particles thus filtered off contain a minor quantity of lithium chloride, these particles are washed with the polar solvent and the solvent used for washing is added to the residual solution to raise the recovery rate of lithium chloride.

(B) Solid-Liquid Separation

If sodium chloride is present in the residual solution obtained by the operation (A), the solution is subjected to a solid-liquid separation. That is, if sodium sulfide or hydrosulfide is used as alkali metal sulfide or hydrosulfide, sodium chloride, which is insoluble in the solvent, is produced as an alkali metal salt. In this case, sodium chloride insoluble in the solvent is separated by carrying out a solid-liquid separation after the PAS polymer filtration (A).

The solid-liquid separating step may be carried out by centrifugation or filtration and preferably by centrifugation. In the latter case, a centrifugal separator may be driven continuously without clogging.

(C) Dehydration and Concentration

If water is present in the solution during crystallization, lithium chloride may be dissolved in water to render the crystallization process difficult. It is therefore desirable to carry out dehydration of the solvent. From the viewpoint of crystallization, the polar solvent is preferably concentrated to close to saturation solubility of lithium chloride. However, the concentration process need not necessarily be carried out because the process leads to a raised solution density with concomitant disadvantages as will be explained subsequently.

Although dehydration and concentration may be carried out in any desired manner, such as by a flash method or a thin-film evaporation method. it is preferred to carry out the process under a reduced pressure to minimize decomposition of the polar solvents.

According to the present invention, lithium chloride contained in the residual solution following the operations of filtration, solid-liquid separation, dehydration and concentration, is recovered by crystallization. Although crystallization may be performed in any desired manner, such as by a flash method or a temperature decreasing method, the latter is more preferred as the crystallization method because the flash method leads to a raised viscosity of the solution to give rise to the following disadvantages I and II:

I. The separation efficiency at the time of centrifugation of crystallized lithium chloride is lowered; and II. The solution is not agitated satisfactorily during crystallization so that crystallized lithium chloride tend to become nonuniform in distribution or affixed to the wall surface.

If crystallization is performed on accordance with the temperature decreasing method, the residual solution is heated to 50° to 200° C., preferably to 100° to 150° C. and subsequently the temperature of the solution is lowered. The rate of lowering of temperature is preferably 10° to 20° C./hr., above all, 10° to 15° C./hr. If the rate of lowering of temperature is higher than 20° C./hr, impurities tend to be included in the produced crystal. On the other hand, the cooling rate lower than 10° C./hr is not economical because much time is consumed for crystallization. The lower the solvent temperature, the higher becomes the rate of recovery. However, since the viscosity of the solution is raised with lowering in the liquid temperature, the temperature to which the solution is cooled is preferably 10° to 120° C., above all, 20° to 60° C.

According to the present invention, a solvent which differs from and is soluble in the polar solvent used for the reaction and in which lithium chloride is not soluble may be added to the residual solution. Such solvent is referred to hereinafter as a third solvent. If the third solvent is added in this manner to the solution during crystallization, the solubility of the lithium chloride in the polar solvent is lowered due to the presence of the third solvent, so that lithium chloride tends to be crystallized more readily for the same amount of the polar solvent.

On the other hand, if crystallization is to be carried out by the temperature lowering method, the lower the temperature, the higher becomes the rate of recovery of lithium chloride. If the third solvent is added, the same rate of recovery as that when the third solvent is not used may be obtained with a lesser extent of temperature lowering, whilst the rate of temperature lowering maybe increased as compared to that when the third solvent is not used. Thus, crystallization may be carried out more efficiently. Besides, if the third solvent is used, a flash cooling system which takes advantage of the latent heat of the third solvent may be used to prevent deposition of crystal products on the heat transfer surface as may occur in the case of ordinary cooling.

Since the third solvent is usually introduced into the hot solution directly after dehydration, it may be vaporized off immediately charging if it has a lower boiling point. For this reason, the third solvent having a higher boiling point, such as benzene, toluene or xylene, above all p-xylene, is preferred.

There is no particular limitation to the amount of addition of the third solvent. Although the rate of recovery of lithium chloride becomes higher with increase in the amount of addition of the third solvent, the amount of the third solvent equal to or less than that of the residual solution, above all, 0.2 to 1.0 vol.%, is preferred from the viewpoint of solvent recovery in the subsequent step.

Although the crystallized lithium chloride is separated and recovered by suitable means, such as by centrifugation, the solution remaining after separation of lithium chloride is preferably recycled and subjected to a second crystallization step for additionally improving the lithium chloride recovery rate.

Although crystallization at the time of recycling may be performed batch wise after each separation of lithium chloride, it would be economically more advantageous to add the residual solution to the new solution to carry out the process continuously.

EXAMPLES

The present invention will be explained with reference to several Examples which are given for illustration only and are not intended for limiting the invention.

Example 1

9.13 Kg (54.3 mols) of sodium sulfide pentahydrdate, 2.3 Kg (54.3 mols) of lithium chloride and 30 liters of N-methyl-2-pyrrolidone were charged into an autsclave and water was distilled off at 160° C. under reduced pressure. 100 liters of N-methyl-2-pyrrolidone, and 7.98 Kg (54.3 mols) of p-dichlorobeznene were added to the reaction system, and a resulting mass was reacted at 260° C. for three hours to produce a reaction mixture.

Polyphenylene sulfide particles and sodium chloride insoluble in the solvent were then filtered off from the reaction mixture to obtain a residual solution. The solution had the following composition:

| | |
|---|---|
| N-methyl-2-pyrrolidone | 91.0 wt % |
| p-dichlorobenzene | 1.0 wt % |
| water | 1.0 wt % |
| lithium chloride | 5.9 wt % |
| sodium chloride | 0.1 wt % |
| oligomer | 1.0 wt % |

1Kg of this solution was sampled and concentrated by heating to 120° C. to 40 mm Hg (absolute pressure). The solution was concentrated to a lithium chloride concentration of 15 wt % and then cooled gradually at a cooling rate of 10° C./hr. Lithium chloride was precipitated gradually with progress in cooling. The solution was centrifuged at the time when it was cooled down to 20° C. Thus, 24 g of lithium chloride were produced with a recovery rate of $24/59 \times 100 = 40.7\%$. Purity of lithium chloride was 98.7%. The produced lithium chloride crystals were of a large size with a diameter in a range of 1 to 2 mm.

Example 2

1Kg of the solution, which is the same as that of Example 1, was sampled, and added to by the same amount of a p-xylene solution (third solvent). The resulting mass was cooled at a cooling rate of 40° C./hr. With progress in cooling, lithium chloride started to be precipitated gradually. The solution was centrifuged at the time when it was cooled down to 50° C. Thus, 48 g of lithium chloride were produced with a recovery rate of $48/59 \times 100 = 81.4\%$. Purity of lithium chloride was 98.8%. Produced crystals of lithium chloride were of a larger size with a diameter in a range of 1 to 2 mm.

Example 3

A solution left after centrifugal separation of lithium chloride in accordance with Example 1 was heated to 120° C. and concentrated to a lithium chloride concentration of 15 wt. %. The solution was then cooled gradually at a rate of 10° C./hr. With progress in cooling, lithium chloride started to be precipitated gradually. When the solution was cooled to 20° C., the solution was centrifuged to produce 14 g of lithium chloride. The solution was heated to 120° C. and concentrated to a lithium chloride concentration of 15 wt. %. The resulting product was processed in the similar manner to produce 8 g of lithium chloride. The recovery rate was $(24+14+8)/59 \times 100\% = 78.0\%$.

Example 4

The solution left after the removal of lithium chloride by centrifugation in Example 2 was heated to 120° C. and concentrated to a lithium concentration of 15 wt %. Then, an equal amount of p-xylene solution was added to the reaction mass and the resulting mixture was cooled gradually at the cooling rate of 40° C./hr. With progress in cooling, lithium chloride started to be precipitated gradually. On cooling to 50° C., the solution was centrifuged to produce 7 g of lithium chloride. The recovery rate was $(48+7)/59 \times 100\% = 93.2\%$.

What is claimed is:

1. A method for recovering lithium chloride comprising the steps of:
   reacting a dihalogen aromatic compound with an alkali metal sulfide and/or alkali metal hydrosulfide in a polar solvent in the presence of lithium chloride to produce a reaction mixture,
   separating polyarylene sulfide particles and insolubles in said solvent from said reaction mixture to produce a residual solution, and
   separating and recovering lithium chloride by heating said residual solution to 50° to 200° C., then lowering the temperature of the solution at a rate of 10° to 20° C./hr to carry out a crystallization.

2. The method as claimed in claim 1 wherein crystallization is carried out after dehydration of said residual solution.

3. The method for recovering lithium chloride according to claim 1, wherein said residual solution is heated to 100° to 150° C.

4. The method for recovering lithium chloride according to claim 1, wherein the temperature of the residual solution is lowered at a rate of 10° to 15° C./hr.

5. The method as claimed in claim 1 wherein a solvent which is different from said polar solvent and soluble in said polar solvent and in which lithium chloride is not soluble is added to the residual solution for crystallization.

6. The method as claimed in claim 5 wherein said solvent different from said polar solvent is selected from the group consisting of benzene, toluene or xylene.

7. The method as claimed in claim 5 wherein the amount of the solvent added to the residual solution is equal to or less than that of the residual solution.

8. The method as claimed in claim 1 wherein a solution freed of lithium chloride by crystallization is recycled to carry out crystallization a plural number of times.

* * * * *